US009705864B2

United States Patent
Wang et al.

(10) Patent No.: US 9,705,864 B2
(45) Date of Patent: Jul. 11, 2017

(54) MEDIA SESSION RESUMPTION IN WEB SESSION RESTORATION

(71) Applicant: Futurewei Technologies, Inc., Plano, TX (US)

(72) Inventors: Xiaobo Wang, San Jose, CA (US); Xin Song, Beijing (CN); Zhuoming Li, Xi'an (CN)

(73) Assignee: Futurewei Technologies, Inc., Plano, TX (US)

( * ) Notice: Subject to any disclaimer, the term of this patent is extended or adjusted under 35 U.S.C. 154(b) by 331 days.

(21) Appl. No.: 14/566,250

(22) Filed: Dec. 10, 2014

(65) Prior Publication Data

US 2016/0173464 A1 Jun. 16, 2016

(51) Int. Cl.
*H04L 29/06* (2006.01)
*H04L 29/08* (2006.01)
*H04L 29/12* (2006.01)

(52) U.S. Cl.
CPC .......... *H04L 63/08* (2013.01); *H04L 61/2575* (2013.01); *H04L 61/2589* (2013.01); *H04L 63/06* (2013.01); *H04L 65/103* (2013.01); *H04L 65/104* (2013.01); *H04L 65/1069* (2013.01); *H04L 65/1073* (2013.01); *H04L 67/02* (2013.01); *H04L 61/2514* (2013.01)

(58) Field of Classification Search
CPC ... H04L 63/06; H04L 63/062; H04L 63/0807; H04L 63/029; H04L 63/02; H04L 63/0209
See application file for complete search history.

(56) References Cited

U.S. PATENT DOCUMENTS

| | | | | |
|---|---|---|---|---|
| 2010/0017596 A1* | 1/2010 | Schertzinger | ........... | G06F 21/33 713/155 |
| 2011/0320820 A1* | 12/2011 | Wray | ...................... | G06F 21/31 713/176 |

OTHER PUBLICATIONS

Uberti, et al., "Javascript Session Establishment Protocol.," draft-ietf-rtcweb-jsep-06, Feb. 13, 2014, 51 pages.
Oracle, "Oracle Communications WebRTC Session Controller—Web Application Developer's Guide, Release 7.0," Nov. 2013, 112 pages.
Srisuresh, et al., "IP Network Address Translator (NAT) Terminology and Considerations," RFC 2663, Aug. 1999, 30 pages.
Rosenberg, et al., "SIP: Session Initiation Protocol," RFC 3261, Jun. 2002, 269 pages.
Baugher, et al., "The Secure Real-Time Transport Protocol (SRTP)," RFC 3711, Mar. 2004, 56 pages.

(Continued)

*Primary Examiner* — Edward Zee
(74) *Attorney, Agent, or Firm* — Conley Rose, P.C.

(57) ABSTRACT

A call establishing method comprising registering with a server to obtain authorization credentials, obtaining a client encryption key using the authorization credentials, wherein the client encryption key is uniquely associated with a web session, establishing a media session for the web session, creating a client side call state for the media session using the client encryption key, wherein the client side call state comprises call information that is associated with the web session and the media session, and wherein the client side call state is encrypted using the client encryption key, and storing the client side call state within a network device.

19 Claims, 7 Drawing Sheets

(56) References Cited

OTHER PUBLICATIONS

Rosenberg, "Interactive Connectivity Establishment (ICE): A Protocol for Network Address Translator (NAT) Traversal for Offer/Answer Protocols," RFC 5245, Apr. 2010, 117 pages.
Rosenberg, et al., "Session Transversal Utilities for NAT (STUN)," RFC 5389, Oct. 2008, 51 pages.
Mahy, et al., "Traversal Using Relays Around NAT (TURN): Relay Extensions to Session Traversal Utilities for NAT (STUN)," RFC 5766, Apr. 2010, 67 pages.
Bergkvist, Ed., et al., "WebRTC 1.0: Real-time Communication Between Browsers," E3C Editor's Draft, http//:dev.w3.org/2011/webrtc/editor/webrtc.html, downloaded from the Internet Sep. 30, 2014, 60 pages.
Bergkvist, Ed., et al., "WebRTC 1.0: Real-time Communication Between Browsers," W3C Working Draft, http//www.w3.org/TR/webrtc/, downloaded from the Internet Sep. 30, 2014, 54 pages.

\* cited by examiner

MEDIA SESSION RESUMPTION IN WEB SESSION RESTORATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A web browser (commonly referred to as a browser) is a software application for retrieving, presenting, and traversing information resources on the World Wide Web. Some web browsers utilize a technology referred to as Web Real-Time Communications (WebRTC). WebRTC is a technology drafted by the Worldwide Web Consortium (W3C) that enables browser-based applications (e.g., a JavaScript client in a browser) to support audio or video-calling, video chat, peer-to-peer (P2P) file sharing, and the like, without requiring a plugin in the browser. When a user is visiting a web site and starts using a web session, the user device may briefly lose a connection due to a network reconnection triggering event. A network reconnection trigger event may include, but is not limited to, a user refreshing a page, a user leaving a page (e.g., clicks back or forth button), a device moving out of and back into a hot spot, and a device turning off and back on. At a later time the user is able to reestablish the network connection and to restore the web session. During web session restoration, the browser will recreate all network connections and will resume web session (e.g., using session cookies). Web session restoration recovers a web session, but does not recover the media session. For example, a user will have to call another user again if web session restoration occurs during a call (e.g., a video conference or a Voice over Internet Protocol (VoIP) call). In some instances, the user may determine that the media session should not be resumed to avoid privacy or security issues. For example, it may be desirable to not resume a media session automatically or when a delay is too long.

SUMMARY

In one embodiment, the disclosure includes a call establishing method comprising registering with a server to obtain authorization credentials, obtaining a client encryption key using the authorization credentials, wherein the client encryption key is uniquely associated with a web session, establishing a media session for the web session, creating a client side call state for the media session using the client encryption key, wherein the client side call state comprises call information that is associated with the web session and the media session, and wherein the client side call state is encrypted using the client encryption key, and storing the client side call state within a network device.

In another embodiment, the disclosure includes an apparatus, comprising a receiver configured to receive signaling commands and data traffic from within a network, and a processor coupled to a memory and the receiver, wherein the memory comprises computer executable instructions stored in a non-transitory computer readable medium such that when executed by the processor causes the processor to register with a server to obtain authorization credentials, establish a web session using the authorization credentials, obtain a client encryption key using the authorization credentials, wherein the client encryption key is uniquely associated with the web session, establish a media session for the web session, and generate a client side call state for the media session using the client encryption key, wherein the client side call state comprises call information that is associated with the web session and the media session, and wherein the client side call state is encrypted using the client encryption key.

In yet another embodiment, the disclosure includes an apparatus, comprising a receiver configured to receive signaling commands and data traffic from within a network, and a processor coupled to a memory and the receiver, wherein the memory comprises computer executable instructions stored in a non-transitory computer readable medium such that when executed by the processor causes the processor to detect a network reconnection triggering event, wherein the network reconnection triggering event disconnects a web session and a media session, restore the web session with a server using authorization credentials, receive a client encryption key and a server side call state in response to restoring the web session, wherein the client encryption key is associated with the web session, wherein the server side call state is associated with the media session, and wherein the server side call state comprises call information associated with the media session, decrypt a client side call state using the client encryption key to obtain the call information from the client side call state, and restore the media session using at least a portion of the call information from the server side call state and at least a portion of the call information from the client side call state.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for resuming a media session after web session restoration. In an embodiment, a network device is configured to establish a web session (e.g., a WebRTC call), to generate a call state using call information, to perform web session restoration, and to resume a media session using the call information and/or the call state. Resuming a media session is performed using call restoration which utilizes a Session Traversal Utilities for Network Address Translators (NATs) (STUN)/Traversal Using Relays around NATs (TURN) protocol to perform NAT traversal. Furthermore, call resumption can reuse previously allocated media resources (e.g., a pinhole on a media gateway), reduce signaling, and avoid dangling ports. Call restoration can be implemented using existing, browser Application Programming Interfaces (APIs), architectures, and protocols (e.g., media protocols).

Figure 1:
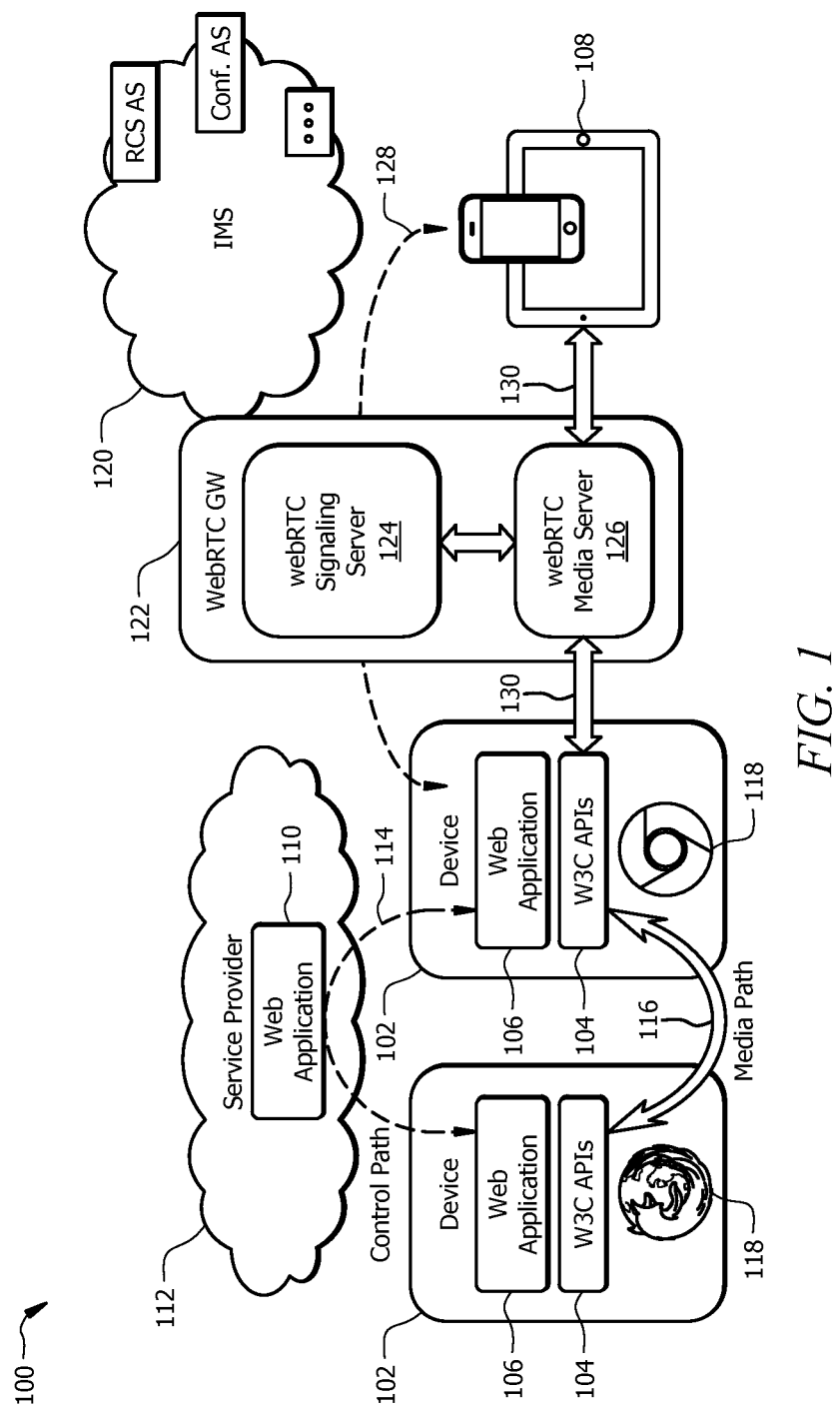
FIG. 1 is a schematic diagram of a WebRTC system.

FIG. 1 is a schematic diagram of a WebRTC system 100. WebRTC is described in more detail in the W3C Working Draft 10 document WebRTC 1.0: Real-time Communication Between Browsers published in September 2013, and in the W3C Editor's Draft 01 document WebRTC 1.0: Real-time Communication Between Browsers published in July 2014, both of which are incorporated herein by reference as if reproduced in their entirety. As shown in FIG. 1, the WebRTC system 100 includes one or more computing devices, which for convenience will be referred to herein as clients 102. In some embodiments, one or both of the clients 102 is a personal computer (PC), tablet computer, or mobile phone. In some embodiments, each client 102 includes one or more W3C APIs 104 used to handle a web application 106. For example, web application 106 can be a web page configured to execute JavaScript. In another example, the web application 106 is a web application with video calling capabilities (e.g., a collaboration application) or to otherwise facilitate communication between the clients 102 or between one of the clients 102 and a target 108. The web application 106 of each client 102 is configured to communicate with the corresponding web application 110 of a service provider 112 through a control path 114. As such, the service provider 112 provides the appropriate signaling to facilitate, for example, a video call between the clients 102. The media for the video call is exchanged between the clients 102 through a media path 116. Each client 102 also includes a browser 118 (e.g., Mozilla Firefox® or Google Chrome®). The browser permits a user of the client 102 to interact with the web application 106. In some cases, the browser 118 of the client 102 is configured to support WebRTC communications. When the browser 118 of the client 102 supports WebRTC, the clients 102 are able to engage in multi-media communications (e.g., browser-to-browser communications, browser-to-phone communications, and browser-to-voice over internet protocol (VoIP) communications) without the need for a plugin. As an example, when one client 102 wants to initiate a video call with the other client 102, the web application 106 of the client 102 initiating the video call contacts the web application 110 of the service provider 112 to request that the service provider 112 provide the signaling to facilitate the call. The web application 110 of the service provider 112 provides the requested signaling using the control path 114 and the clients 102 exchange media over the media path 116. When the user of one client 102 wants to end the video call, the web application 106 of that client 102 advises the web application 110 of the service provider 112 of the desire to end the call, the signaling used to facilitate the video call ceases, and the exchange of media between the clients 102 over the media path 116 ends.

In some circumstances, the target 108 is a mobile device (e.g., a smart phone, tablet, etc.) that communicates though an Internet Protocol (IP) multimedia system (IMS) 120, a circuit switch (CS), or a public switched telephone network (PSTN) and does not support WebRTC. Because the target 108 does not support WebRTC, the clients 102 are unable to engage in browser-to-browser communications with the target 108. For example, the codec used for encoding and decoding the digital data stream or signal of the target 108 is different than the codec used for encoding and decoding the digital data stream or signal of the client 102. In order for the target 108 to communicate with one of the clients 102, a WebRTC gateway 122 is utilized. The WebRTC gateway 122 extends, for example, the IMS subscribers (e.g., the target 108) to the web domain of the service provider 112 and enables those subscribers to enjoy existing services, such as, Rich Communication Services (RCS), conference as a service, and so on. The WebRTC gateway 122 is configured to convert the digital data stream or signals from the clients 102 into a format that the target 108 is capable of utilizing, and vice versa. The WebRTC gateway 122 is also configured to provide the signaling needed to facilitate communications between the clients 102 and the target 108. In some embodiments, the WebRTC gateway 122 comprises a signaling server 124 and a media server 126. As used herein, the signaling server 124 may be referred to as a signaling gateway and the media server 126 may be referred to as a media gateway. As shown, the signaling server 124 and the media server 126 are operably coupled to each other. While the signaling server 124 and the media server 126 are shown proximate one another in FIG. 1, the signaling server 124 and the media server 126 may be remotely located from each other in some embodiments. The signaling server 124 is configured to handle a transport protocol (e.g., Hypertext Transfer Protocol Secure (HTTPS)) and a signaling protocol (e.g., session initiation protocol (SIP)). For example, signal server 124 may be configured to implement SIP over Web-Socket or JavaScript Object Notation (JSON) over Web-Socket. Therefore, the signaling server 124 is able to provide the signaling for communication between the clients 102 and the target 108 through a control path 128. For example, the signaling server 124 uses the control path 128 to send a phone call notification to the target 108 when one of the clients 102 is attempting to place a video call to the target 108. As shown in FIG. 1, the media server 126 provides media to the clients 102 and to the target 108 through a media path 130 extending between the WebRTC gateway 122 and the clients 102 and between the WebRTC gateway 122 and the target 108. Thus, media (e.g., data from a video call) from one of the clients 102 is delivered to the media server 126 in the WebRTC gateway 122 over the media path 130, converted into a format consistent with the target 108 by the media server 126, and then delivered by the media server 126 to the target 108 over the media path 130. Likewise, media from the target 108 is delivered to the media server 126 in the WebRTC gateway 122 over the media path 130, converted into a format consistent with the client 102 by the media server 126, and then delivered by the media server 126 to the client 102 over the media path 130. In this fashion, the clients 102 and the target 108 are able to participate in communications, such as, video calls, video chats, peer-to-peer file sharing, and so on.

Figure 2:
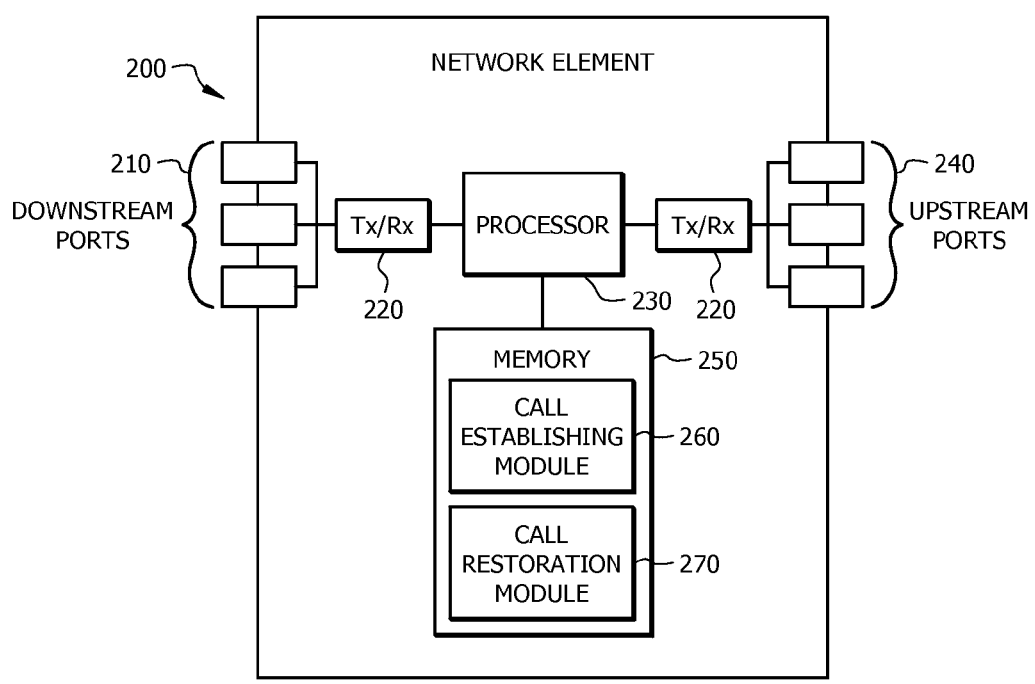
FIG. 2 is a schematic diagram of an embodiment of a network element used to transport and process data traffic through a WebRTC system.

FIG. 2 is a schematic diagram of an embodiment of a network element 200 used to transport and process data traffic or information through a WebRTC system 100 shown in FIG. 1. For example, network element 200 is implemented in and/or integrated within a client 102 or a target 108 described in FIG. 1. At least some of the features/methods described in the disclosure are implemented in the network element 200. For instance, the features/methods of the disclosure may be implemented in hardware, firmware, and/or software installed to run on the hardware. The network element 200 may be any device (e.g., a modem, a switch, router, bridge, server, client, etc.) that transports data through a network, system, and/or domain. Moreover, the terms network "element," "node," "component," "module," and/or similar terms may be interchangeably used to generally describe a network device and do not have a particular or special meaning unless otherwise stated and/or claimed within the disclosure. In one embodiment, the network element 200 is an apparatus configured to establish a web call session and media session (e.g., WebRTC call), to communicate data traffic, to perform web session restoration, and to perform restore a media session.

The network element 200 comprises one or more downstream ports 210 coupled to a transceiver (Tx/Rx) 220, which may be transmitters, receivers, or combinations thereof. The Tx/Rx 220 transmit and/or receive frames from other network nodes via the downstream ports 210. Similarly, the network element 200 comprises another Tx/Rx 220 coupled to a plurality of upstream ports 240, wherein the Tx/Rx 220 transmit and/or receive frames from other nodes via the upstream ports 240. The downstream ports 210 and/or the upstream ports 240 may include electrical and/or optical transmitting and/or receiving components.

A processor 230 may be coupled to the Tx/Rx 220 and may be configured to process the frames and/or determine which nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to establish a web session and a media session, to restore a web session, and to restore a media session.

FIG. 2 illustrates that a memory module 250 is coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 is used to house the instructions for carrying out the various example embodiments described herein. In one example embodiment, the memory module 250 comprises a call establishing module 260 and a call restoration module 270 that can be implemented on the processor 230. In one embodiment, the call establishing module 260 establishes a web session and a media session. For example, the call establishing module 260 is configured to establish a WebRTC web session and media session, to obtain call information and a client encryption key, and to generate a call state that comprises call information that is protected with the client encryption key. The call information or the call state can be used for call restoration. Call restoration module 270 is configured to resume a media session using the call information or the call state following a network reconnection triggering event. In an embodiment, such may be done according to call establishing method 300 described in FIG. 3, call restoration method 400 described in FIG. 4, call establishing method 500 described in FIG. 5, and/or call restoration method 600 described in FIG. 6. Call establishing module 260 and call restoration module 270 can be implemented in a transmitter (Tx), a receiver (Rx), or both.

It is understood that by programming and/or loading executable instructions onto the network element 200, at least one of the processors 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
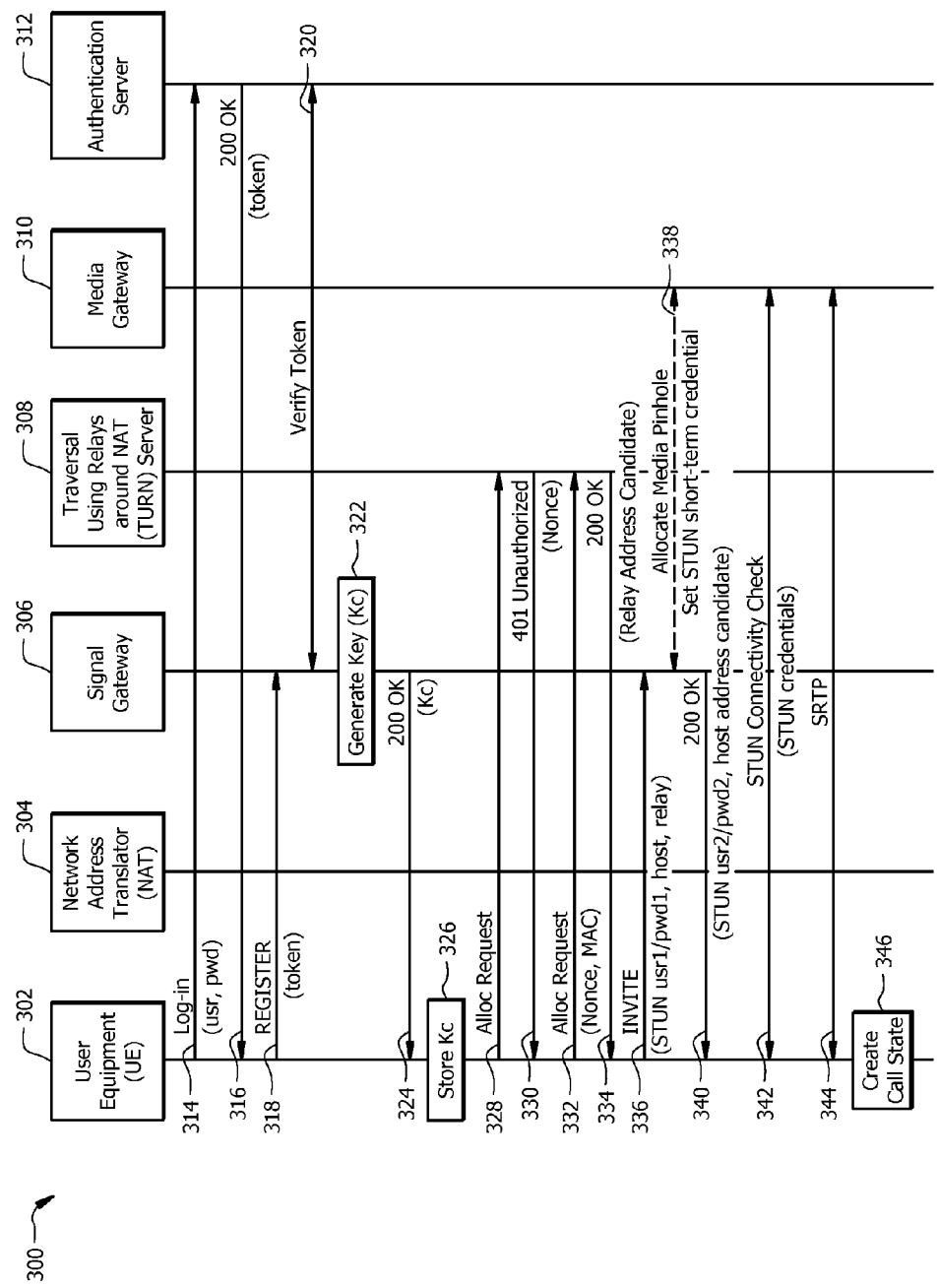
FIG. 3 is a protocol diagram of an embodiment of a call establishing method.

FIG. 3 is a protocol diagram of an embodiment of a call establishing method 300 that may be employed by a user to establish a call (e.g., a web session and a media session) between a plurality of UEs. UE 302 may be configured similar to client 102 or target 108 described in FIG. 1. NAT 304 is configured to modify network address information in Internet Protocol (IP) datagram packet headers and to provide one-to-one IP address translations. For example, NAT 304 may be configured similar to as described in Internet Engineering Task Force (IETF) Request For Comments (RFC) 2663 entitled, "IP Network Address Translator (NAT) Terminology and Considerations," by Srisuresh, et al., published August 1999, which is hereby incorporated by reference as if reproduced in its entirety. Signal Gateway 306 is a network device that is configured to communicate signaling messages between UE 302 and the other network devices, such as, media gateway 310 and authentication server 312. TURN server 308 is a NAT traversal server and gateway for general purpose network traffic and media traffic. TURN server 308 may be configured to implement a TURN protocol similar to as described in IEFT RFC 5766 entitled, "Traversal Using Relays around NAT (TURN): Relay Extensions to Session Traversal Utilities for NAT (STUN)," by Mahy, et al., published in April 2010, which is hereby incorporated by reference as if reproduced in its entirety. Media gateway 310 is a translation device or service that converts or distributes digital media streams between networks. Authentication server 312 is a network device that is configured to authenticate credentials for users, such as, account names and passwords. In an embodiment, UE 302, NAT 304, signal gateway 306, TURN server 308, media gateway 310, and authentication server 312 are configured to communicate with each other using a SIP protocol. For example, a SIP protocol may be similar to as described in IEFT RFC 3261 entitled, "SIP: Session Initiation Protocol," by Rosenberg, et al., published in June 2002, which is hereby incorporated by reference as if reproduced in its entirety. In another embodiment, UE 302, NAT 304, signal gateway 306, TURN server 308, media gateway 310, and/or authentication server 312 can be configured to communicate with each other using any other protocol as would be appreciated by one of ordinary skill in the art upon viewing this disclosure.

At step 314, UE 302 sends log-in credentials (e.g., a username and a password) to authentication server 312 to obtain authorization credentials, for example, a token (e.g., an access token) or a cookie (e.g., a session cookie). At step 316, UE 302 receives a request success message (e.g., 200 OK response code) from authentication server 312 that comprises the token. At step 318, UE 302 sends a registration request (e.g., a REGISTER request message) that comprises the authorization credentials (e.g., the token) to signal gateway 306. At step 320, signal gateway 306 and authentication server 312 exchange the token to verify the registration request by validating (e.g., authenticating and/or authorizing) the token. At step 322, signal gateway 306 generates a client encryption key (Kc) upon verifying the registration request. The client encryption key is uniquely associated with the web session. A client encryption key can be generated using any suitable technique as would be appreciated by one of ordinary skill in the art upon viewing this disclosure. At step 324, signal gateway 306 sends a registration request success message (e.g., 200 OK response code) to UE 302 that comprises the client encryption key. At step 326, UE 302 stores the client encryption key, for example, into memory.

At step 328, UE 302 sends a relay address allocation request to TURN server 308. The relay address allocation request requests a relay address for communicating media traffic. At step 330, UE 302 receives a user authentication request message (e.g., 401 unauthorized response code) that comprises a nonce from the TURN server 308 in response to sending the relay allocation request. The nonce is a random or pseudorandom value issued by the authentication protocol that is used to verify a user. At step 332, UE 302 uses the nonce and TURN long-term credentials to calculate a TURN message authentication code (MAC). For example, the nonce may be used with a hashing algorithm to determine the TURN MAC. Upon obtaining the TURN MAC, UE 302 sends another relay address allocation request that comprises the nonce and the TURN MAC to TURN server 308 to obtain Interactive Connectivity Establishment (ICE) candidates for UE 302. ICE candidates may include, but are not limited to, host candidates, server reflexive candidates, peer reflexive candidates, and relay candidates. Additional details for ICE candidates may be as described in IETF RFC 5245 entitled, "Interactive Connectivity Establishment (ICE): A Protocol for Network Address Translator (NAT) Traversal for Offer/Answer Protocols," by J. Rosenberg, et. al., published April 2010, which is hereby incorporated by reference as if reproduced in its entirety. At step 334, TURN server 308 sends a relay address allocation request success message (e.g., 200 OK response code) to UE 302. The relay address allocation request success message identifies a relay address candidate. At step 336, UE 302 sets up a call by sending an invitation request (e.g., an INVITE message) to signal gateway 306. In an embodiment, the invitation request comprises STUN credentials (e.g., a STUN username and a STUN MAC calculated from the STUN password), a host address candidate, and the relay address candidate. At step 338, signal gateway 306 communicates the STUN credentials, the host address candidate, and the relay address candidate with media gateway 310 to allocate media resources (e.g., a media pinhole). For example, a media pinhole can be created for each media stream and to allow inbound signaling and media streams to traverse from UE 302 through a NAT or a firewall (e.g., NAT 304). Allocating the media pinhole sets STUN short-term credentials and uses the STUN credentials, the host address candidate, and the relay address candidate to obtain additional STUN credentials (e.g., a second STUN username and password). At step 340, signal gateway 306 sends an invitation request success message (e.g., 200 OK response code) that comprises the STUN credentials and the host address candidate to UE 302.

At step 342, UE 302 communicates with media gateway 310 to perform a STUN connectivity check. A media session is established when media gateway 310 receives a connectivity check message and authenticates the connectivity check message. At step 344, UE 302 exchanges media traffic with media gateway 310, for example, using Secure Real-time Transport Protocol (SRTP). SRTP may be implemented substantially similar to as described in IETF RFC 3711 entitled, "The Secure Real-time Transport Protocol (SRTP)," by Baugher, et al., published in March 2004, which is hereby incorporated by reference as if reproduced in its entirety. In another embodiment, media traffic can be communicated between UE 302 and media gateway 310 using any other protocol as would be appreciated by one of ordinary skill in the art upon viewing this disclosure.

At step 346, UE 302 creates a client side call state. The client side call state may include, but is not limited to, a call session identifier that is associated with the web session and the media session, a called party identifier, STUN credentials (e.g., STUN username and password), and a peer media path (e.g., IP address or port), ICE candidates, and a flag that indicates whether a relay service (e.g., TURN) is used. When a TURN protocol is used, the client side call state further comprises TURN server information and TURN credentials (e.g., TURN long-term credentials). TURN server information may include, but is not limited to, a TURN server IP address, a protocol, a port associated with a TURN server (e.g., TURN server 308), a relay address, a flag that indicates whether a relay service (e.g., TURN) is used. UE 302 encrypts the client side call state using the client encryption key and stores the encrypted client side call state. Signal gateway 306 may also generate and store a server side call state that comprises call information for the media session. The call information for the server side call state may include, but is not limited to, a call session identifier, a caller identifier, a callee identifier, STUN short-term credentials, STUN parameters, ICE candidates, and a media pinhole address.

Figure 4:
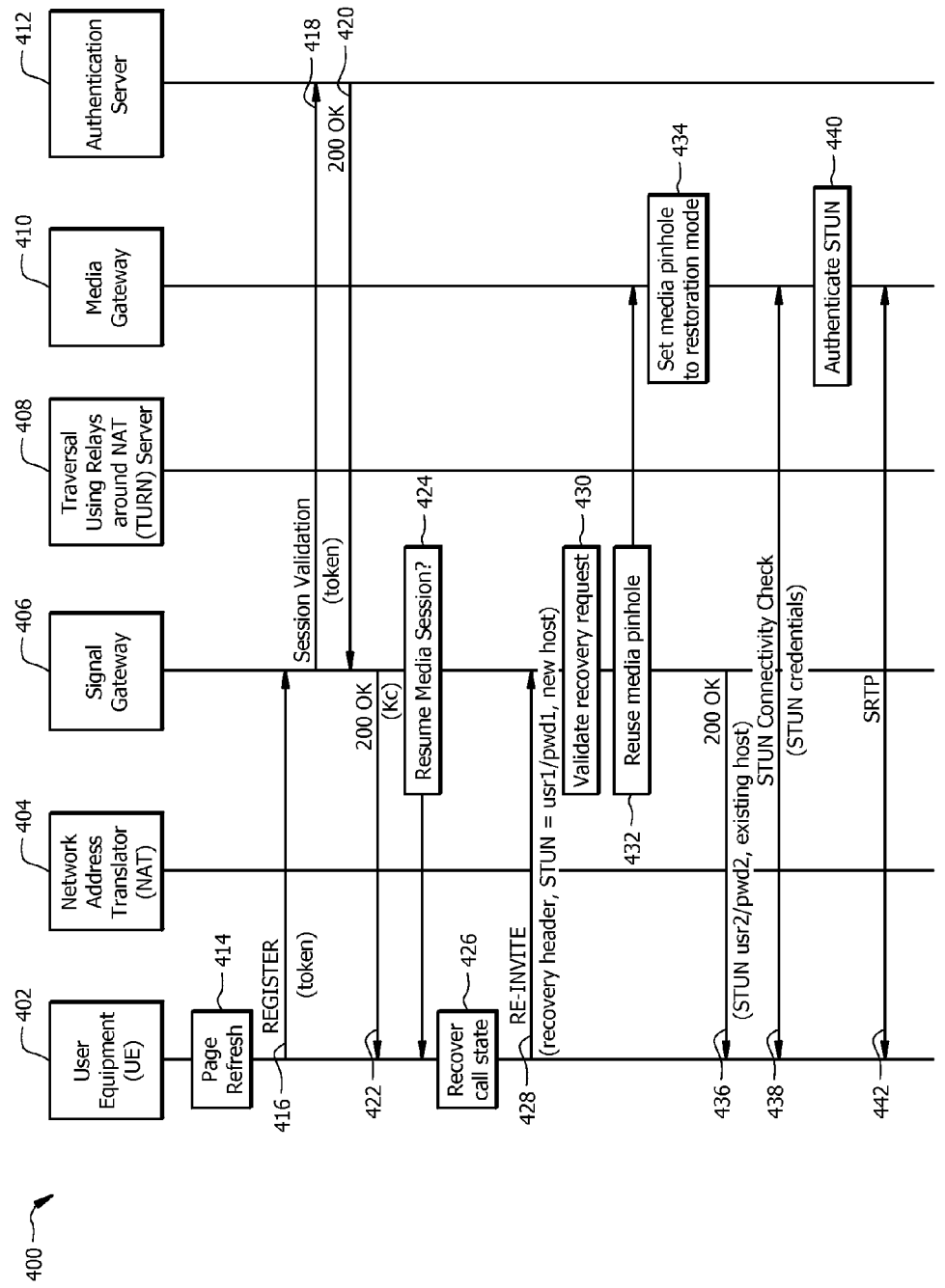
FIG. 4 is a protocol diagram of an embodiment of a call restoration method.

FIG. 4 is a protocol diagram of an embodiment of a call restoration method 400 that may be employed to restore a previous call (e.g., a previous web session and a previous media session) between a plurality of UEs. UE 402, NAT 404, signal gateway 406, TURN server 408, media gateway 410, and authentication server 412 are configured substantially similar to UE 302, NAT 304, signal gateway 306, TURN server 308, media gateway 310, and authentication server 312 described in FIG. 3, respectively.

At step 414, a call connection is broken on a client due to a network reconnection triggering event during a WebRTC call. For example, a web page presenting a WebRTC call on UE 402 is refreshed. At step 416, UE 402 sends a registration request message (e.g., a REGISTER request message) that comprises authentication credentials (e.g., a token or a session cookie) to signal gateway 406. The registration request message requests to restore the previous web session. At step 418, signal gateway 406 verifies the authentication credentials (e.g., using a session cookie) to validate the request. At step 420, authentication server 412 sends a validation success message (e.g., 200 OK response code) to signal gateway 406 upon validating the session. At step 422, signal gateway 406 sends a registration request success message (e.g., 200 OK response code) that comprises a client encryption key that is associated with the previous web session and/or the previous media session to UE 402. At step 424, signal gateway 406 determines whether or not to resume the previous media session. For example, signal gateway 406 may determine to resume a previous media session when signal gateway 406 receives a registration request message that comprises a session cookie for a previous web session. When signal gateway 406 determines to resume the previous media session, signal gateway 406 sends a server side call state that comprises call information for the previous media session to UE 402. The server side call state may be similar to as described in FIG. 3. In an embodiment, signal gateway 406 sends the server side call state using JSON. In another embodiment, signal gateway 406 sends the server side call state using any other protocol as would be appreciated by one of ordinary skill in the art upon viewing this disclosure. At step 426, UE 402 decrypts a client side call state using the client encryption key to recover the call information stored in UE 402 from the previous web session and/or media session. The call information from the client side call state may include, but is not limited to, a call session identifier, a called party identifier that is associated with the web session and/or the media session, STUN credentials (e.g., STUN username and password), a peer media path (e.g., an IP address or port), ICE candidates, and a flag that indicates whether a relay service (e.g., TURN) is used. The STUN credentials comprise the same as the STUN username and password that is used to establish the previous media sessions. When a relay service is used, the call information from the server side call state may further comprise TURN server identifier, TURN long-term credentials, and/or a relay address associated with the relay connection. When a relay service is not used, UE 402 bypasses sending a relay address request and proceeds to step 428; otherwise, UE 402 sets up a new call using call information from the server side call state and the client side call state.

At step 428, UE 402 sends a call restoration message (e.g., a SIP RE-INVITE message) that comprises at least a portion of the call information from the client side call state and the server side call state to signal gateway 406. In an embodiment, the call restoration message comprises a recovery header, STUN credentials, a new host candidate, and a call session identifier for the call session to be restored (e.g., SIP CALL_ID). The recovery header indicates to restore an existing call, including media sessions, using the call session identifier. At step 430, signal gateway 406 validates the call restoration message. The validation steps include, but are not limited to, verifying that signal gateway 406 still has the call session (e.g., the call session is still active) using the call session identifier, verifying that media gateway 410 still has the media session (e.g., the media session is still active) using the call session identifier, and comparing the STUN short-term credentials (e.g., STUN username and password) provided by the client to the STUN short-term credentials stored in the server side call state stored on signal gateway 406. In an embodiment, signal gateway 406 also determines if the call restoration message was sent within an allotted recovery request time window to validate the recovery request. For example, signal gateway 406 determines if the last signaling or media packet from the client was received within an allotted time window. At step 432, signal gateway 406 sends a message to media gateway 410 that instructs media gateway 410 to restore a connection for the media pinhole of the previous media session upon validating the call restoration message. At step 434, media gateway 410 sets the media pinhole to a restoration mode to reestablish the previous media session upon receiving the request from signaling gateway 406. A media pinhole in a restoration mode accepts STUN connectivity requests from any IP address and validates the connectivity request using STUN short-term credentials from the previous media session.

When the connectivity request is authenticated, the media pinhole is pinned down to the address that sent the STUN connectivity request. At step 436, signal gateway 406 sends a recovery success message (e.g., 200 OK response code) to UE 402. The recovery success message comprises a second STUN username and password and an ICE candidate (e.g., an existing host address candidate) that is associated with the media pinhole that is in the restoration mode on the media gateway 410 for the previous media session. At step 438, UE 402 communicates the STUN credentials and the existing host address candidate to media gateway 410 to perform a STUN connectivity check and to restore the previous media session. At step 440, media gateway 410 authenticates the STUN connection for the media session. For example, authenticating a STUN connection may be similar to as described in IEFT RFC 5389 entitled, "Session Traversal Utilities for NAT (STUN)," by Rosenberg, et al., published in October 2008, which is hereby incorporated by reference as if reproduced in its entirety. At step 442, UE 402 exchanges media traffic with media gateway 410 upon establishing the media connection. For example, UE 402 exchanges media traffic with media gateway 410 similar to step 344 described in FIG. 3.

Figure 5:
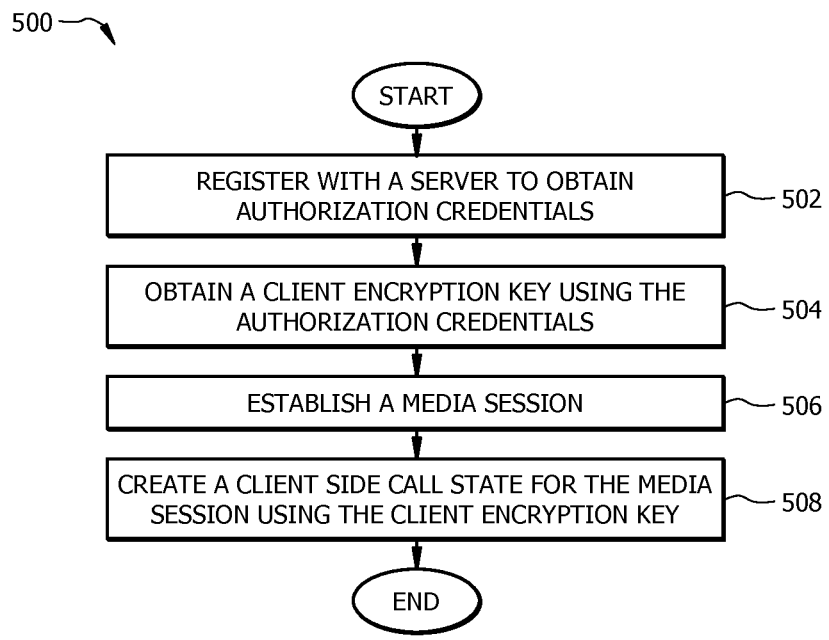
FIG. 5 is a flowchart of an embodiment of a call establishment method for a network device.

FIG. 5 is a flowchart of an embodiment of a call establishment method 500 for a network device to establish a web session and a media session, which may be similar to the instructions stored in call establishing module 260 described in FIG. 2. Call establishment method 500 may be employed by a user to establish a call between a plurality of UEs. In an embodiment, a network device (e.g., UE 302 described in FIG. 3) is configured to register with a server using authentication credentials to obtain a client encryption key using the authentication credentials, to establish a media session, and to create a client side call state using call information and the client encryption key. At step 502, the network device registers with a server (e.g., authentication server 312 described in FIG. 3) to obtain authentication credentials for obtaining a client encryption key. For example, the network device may use a log-in and password to obtain a token and/or a cookie similar to steps 314 and 316 described in FIG. 3. At step 504, the network device sends the authorization credentials (e.g., the token and/or the cookie) to a signal gateway (e.g., signal gateway 306 described in FIG. 3) to obtain a client encryption key. In response to authenticating the authorization credentials, the network device receives the client encryption key from the signal gateway and stores the client encryption key into memory. For example, obtaining a client encryption key using the authorization credentials may be similar to steps 318-326 described in FIG. 3. At step 506, the network device establishes a media session with a media gateway (e.g., media gateway 310 described in FIG. 3). Media traffic can be communicated between the network device and the media gateway once the media session is established. For example, establishing a media session may be similar to steps 328-344 described in FIG. 3. At step 508, the network device creates a client side call state that comprises a call session identifier associated with the media session. The client side call state is encrypted using the client encryption key. Creating a client side call state may be similar to step 346 described in FIG. 3.

Figure 6:
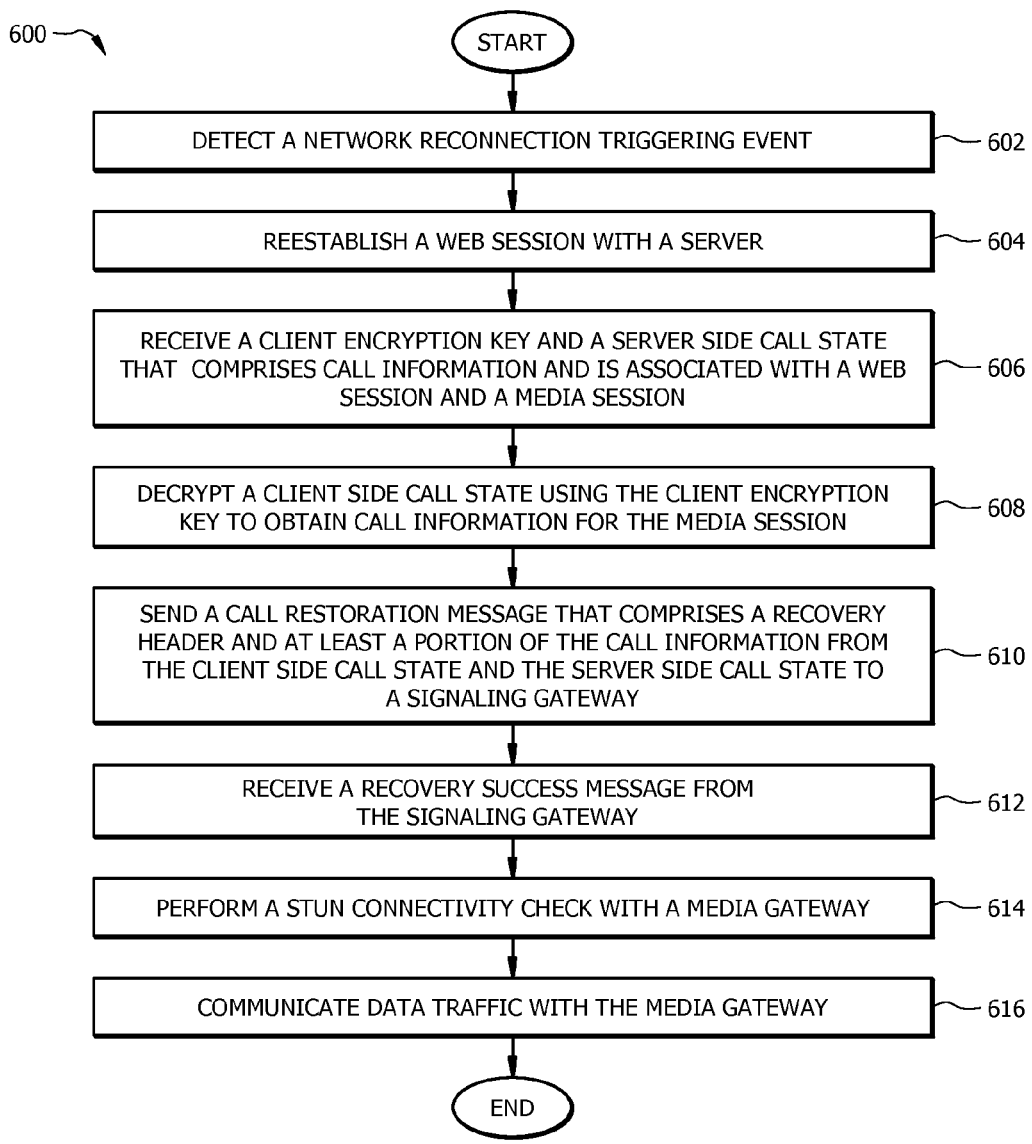
FIG. 6 is a flowchart of an embodiment of a call restoration method for a network device.

FIG. 6 is a flowchart of an embodiment of a call restoration method 600 for a network device to resume a web session and a media session, which may be similar to the instructions stored in call restoration module 270 described in FIG. 2. Call restoration method 600 may be employed to restore a previous call between a plurality of UEs. In an embodiment, a network device (e.g., UE 402 described in FIG. 4) is configured to detect a network reconnection triggering event, to restore a web session, to receive a client encryption key and a server side call state that is associated with a previous web session and a previous media session, to decrypt a client side call state using the client encryption key to obtain call information, and to reestablish the previous media session using the call information from the server side call state and the client side call state.

At step 602, the network device detects a network reconnection triggering event. For example, the network device detects a user refreshing a page, a user leaving a page (e.g., clicks back or forward button), or another network device moving out of and back into a hot spot. At step 604, the network device reestablishes a web session with a server. The network device sends authorization credentials (e.g., a session cookie) to a signal gateway (e.g., signal gateway 406 described in FIG. 4) and to an authentication server (e.g., authentication server 412 described in FIG. 4) to validate and restore the web session. For example, the network device may restore a web session similar to steps 416-422 described in FIG. 4. At step 606, the network device receives a client encryption key and a server side call state that is associated with a previous web session and a previous media session. Upon restoring the web session, the network device receives a client encryption key and a server side call state from the signal gateway similar to steps 422 and 424 described in FIG. 4. At step 608, the network device decrypts a client side call state to obtain call information for the previous media session. In an embodiment, the call information comprises a call session identifier that identifies the media session to reestablish, a called party identifier, STUN credentials (e.g., STUN username and password), and a peer media path. Decrypting the client side call state may be similar to step 426 described in FIG. 4. At step 610, the network device sends a call restoration message that comprises a recovery header (e.g., a recovery header described in FIG. 4) and at least a portion of the call information from the client side call state and at least a portion of the call information from the server side call state to the signaling gateway. The call restoration indicates to restore a media pinhole and a media session using the call information from the client side call state and the server side call state. Sending the call restoration message may be similar to step 428 described in FIG. 4. At step 612, the network device receives a recovery success message from the signaling gateway in response to setting the media gateway setting media pinhole in a restoration mode. Receiving the recovery success message may be similar to step 436 described in FIG. 4. At step 614, the network device performs a STUN connectivity with the media gateway, for example, similar to step 438 described in FIG. 4. At step 616, the network device communicates data traffic with the network device.

Figure 7:
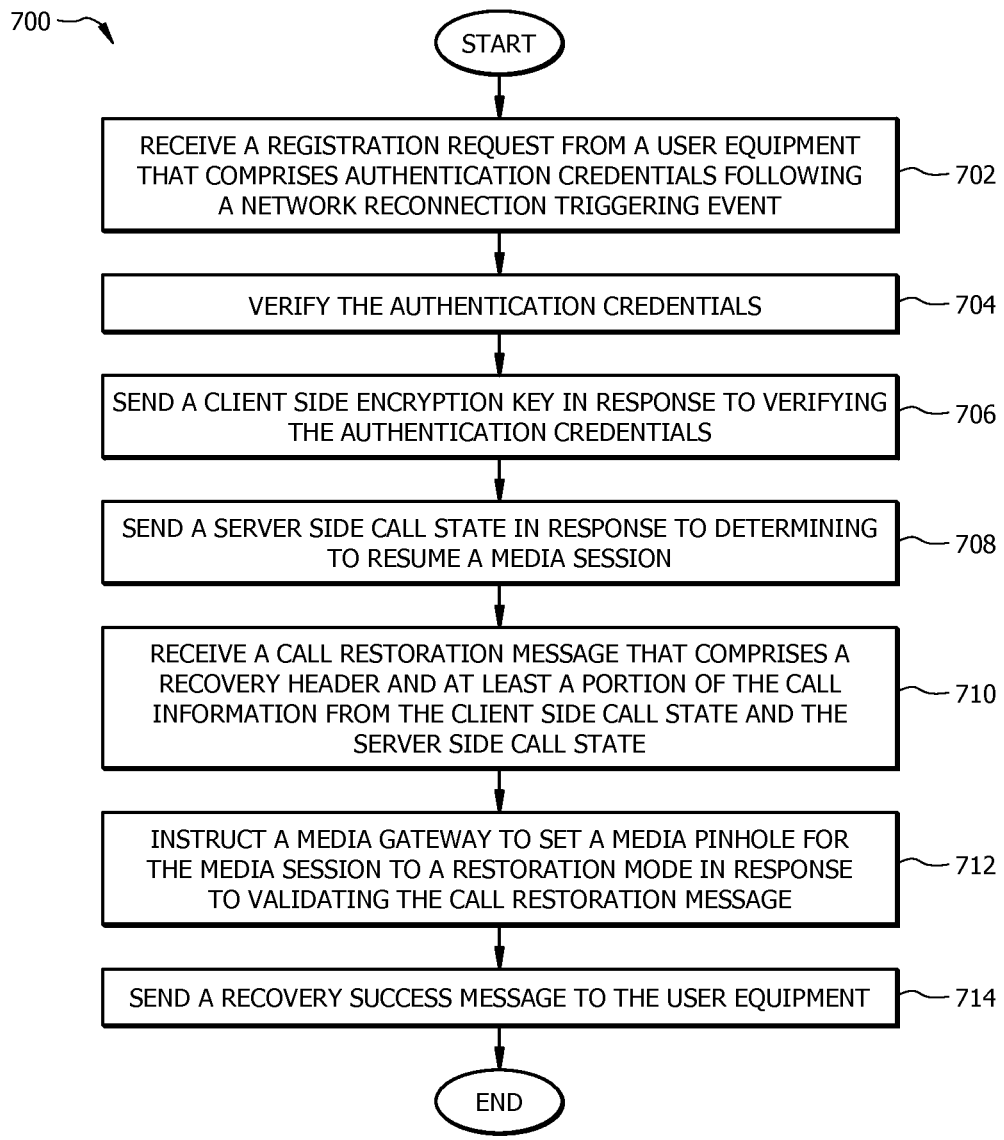
FIG. 7 is a flowchart of another embodiment of a call restoration method for a network device.

FIG. 7 is a flowchart of another embodiment of a call restoration method 700 for a network device to resume a web session and a media session, which may be similar to the instructions stored in call restoration module 270 described in FIG. 2. Call restoration method 700 may be employed to restore a previous call between a plurality of UEs. In an embodiment, a network device (e.g., signaling gateway 406 described in FIG. 4) is configured to receive a registration request from a UE following a network reconnection triggering event, to send a client side encryption key and a server side call state to the UE, and to restore a media session between the UE and a media gateway.

At step 702, the network device receives a registration request from a UE (e.g., UE 402 described in FIG. 4) that comprises authentication credentials (e.g., a token or a session cookie) following a network reconnection triggering event. For example, the network device receives a registration request from a UE when a UE user refreshes a page or a UE user leaves a page (e.g., clicks back or forward button). Receiving a registration request may be similar to step 416 described in FIG. 4. At step 704, the network device verifies the authentication credentials with an authentication server (e.g., authentication server 412 described in FIG. 4). For instance, the network device verifies the authentication credentials similar to steps 418 and 420 described in FIG. 4. At step 706, the network device sends a client side encryption key in response to verifying the authentication credentials similar to step 422 described in FIG. 4. At step 708, the network device determines whether to resume a media session for the UE. In response to determining to resume the media session, the network device sends a server side call state that is associated with the media session. Determining whether to resume a media session may be similar to step 424 described in FIG. 4. At step 710, the network device receives a call restoration message from the UE. The call restoration message comprises a recovery header and at least a portion of the call information from the client side call state and at least a portion of the call information from the server side call state. The call restoration message may be similar to described in FIG. 4. At step 712, the network device validates the call restoration message and sends a message that instructs a media gateway (e.g., media gateway 410 described in FIG. 4) to set a media pinhole for the media session to a restoration mode in response to validating the call restoration message. Validating the call restoration message and instructing the media gateway may be similar to steps 430 and 432 described in FIG. 4. At step 714, the network device sends a recovery success message to the UE when the media gateway sets the media pinhole to a restoration mode. The recovery success message identifies a media path (e.g., an ICE candidate) that corresponds with the media pinhole that is in the restoration mode on the media gateway. For instance, the network device sends a recovery success message to the UE similar to step 436 described in FIG. 4.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A call establishing method comprising:
registering a client with a server to obtain authorization credentials;
sending the authorization credentials to a signaling gateway to obtain a client encryption key, wherein the client encryption key is uniquely associated with a web session;
establishing a media session for the web session by obtaining a Traversal Using Relays around Network Address Translator (TURN) message authentication code (MAC) using TURN long-term credentials associated with the client and providing the TURN MAC to a TURN server to authenticate the client;
creating a client side call state for the media session using the client encryption key, wherein the client side call state comprises call information that is associated with the web session and the media session, and wherein the client side call state is encrypted using the client encryption key; and
storing the client side call state within a network device.

2. The method of claim 1, wherein the authorization credentials comprises a token.

3. The method of claim 1, wherein the call information comprises a call session identifier that is associated with the web session and the media session.

4. A call establishing method comprising:
registering a client with a server to obtain authorization credentials;
sending the authorization credentials to a signaling gateway to obtain a client encryption key, wherein the client encryption key is uniquely associated with a web session;
establishing a media session for the web session by receiving an Interactive Connectivity Establishment (ICE) candidate for the media session from a Traversal Using Relays around Network Address Translator (TURN) server and providing the ICE candidate and Session Traversal Utilities for Network Address Translator (STUN) credentials that are associated with the client to the signaling gateway to request a media pinhole;
creating a client side call state for the media session using the client encryption key, wherein the client side call state comprises call information that is associated with the web session and the media session, and wherein the client side call state is encrypted using the client encryption key; and
storing the client side call state within a network device.

5. The method of claim 4, wherein the call information for the client side call state comprises the STUN credentials that are associated with the client.

6. An apparatus, comprising:
a receiver configured to receive signaling commands and data traffic; and
a processor coupled to a memory and the receiver, wherein the memory comprises computer executable instructions stored in a non-transitory computer readable medium such that when executed by the processor causes the processor to:
detect a network reconnection triggering event on a client, wherein the network reconnection triggering event disconnects a web session and a media session;
send a registration request that comprises authorization credentials to a signaling gateway to restore the web session;

receive a client encryption key and a server side call state in response to the signaling gateway restoring the web session, wherein the client encryption key is associated with the web session, wherein the server side call state is associated with the media session and comprises call information associated with the media session;

decrypt a client side call state using the client encryption key to obtain call information from the client side call state; and send a call restoration message to the signaling gateway that comprises a recovery header and at least a portion of the call information from the server side call state and at least a portion of the call information from the client side call state.

7. The apparatus of claim 6, wherein the computer executable instructions further cause the processor to generate the client side call state that comprises the call information for the media session using the client encryption key, wherein the client side call state is encrypted using the client encryption key.

8. The apparatus of claim 6, wherein the authorization credentials comprise a token, a session cookie, or both.

9. The apparatus of claim 6, wherein the authorization credentials are obtained by establishing the web session with the signaling gateway before the network reconnection triggering event.

10. The apparatus of claim 6, wherein the call information from the client side call state comprises Session Traversal Utilities for Network Address Translator (STUN) credentials that are associated with the media session.

11. The apparatus of claim 10, wherein the STUN credentials are used for authenticating the client.

12. The apparatus of claim 10, wherein the computer executable instructions further cause the processor to perform a Session Traversal Utilities for Network Address Translator (STUN) connectivity check with a media gateway using the STUN credentials.

13. The apparatus of claim 6, wherein the computer executable instructions further cause the processor to:

use the call information from the client side call state to determine whether a relay service is needed to restore the media session; and bypass the relay service to restore the media session when the relay service is not needed.

14. The apparatus of claim 6, wherein the call restoration message comprises a call session identifier that is associated with the web session and the media session.

15. The apparatus of claim 6, wherein the call information from the server side call state identifies a media pinhole address for restoring the media session.

16. An apparatus, comprising:

a receiver configured to receive signaling commands and data traffic;

a processor coupled to a memory and the receiver, wherein the memory comprises computer executable instructions stored in a non-transitory computer readable medium such that when executed by the processor causes the processor to:

receive a registration request that comprises authentication credentials for a web session from a network device;

verify the authentication credentials;

send a client side encryption key to the network device in response verifying the authentication credentials;

determine whether to resume a media session for the network device using the authentication credentials;

send a server side call state to the network device upon determining to resume the media session;

receive a call restoration message from the network device that comprises a recovery header, call information from a client side call state, and call information from the server side call state;

validate the call restoration message; and instruct a media gateway to set a media pinhole for the media session to a restoration mode in response to validating the call restoration message, wherein the setting the media pinhole to the restoration mode configures the media pinhole to receive connectivity requests from any internet protocol address.

17. The apparatus of claim 16, wherein the call information from the client side call state comprises Session Traversal Utilities for Network Address Translator (STUN) credentials.

18. The apparatus of claim 16, wherein the call restoration message comprises a call session identifier, and wherein validating the call restoration message comprises using the call session identifier to determine that a call session is active and to determine the media session is still active in the media gateway.

19. The apparatus of claim 16, wherein validating the call restoration message comprises determining that the call restoration message is received within an allotted time.

* * * * *